Dec. 16, 1941.   H. KATTWINKEL   2,266,213
BRAKE DEVICE, PARTICULARLY FOR AUTOMOBILE VEHICLES
Filed Aug. 10, 1938
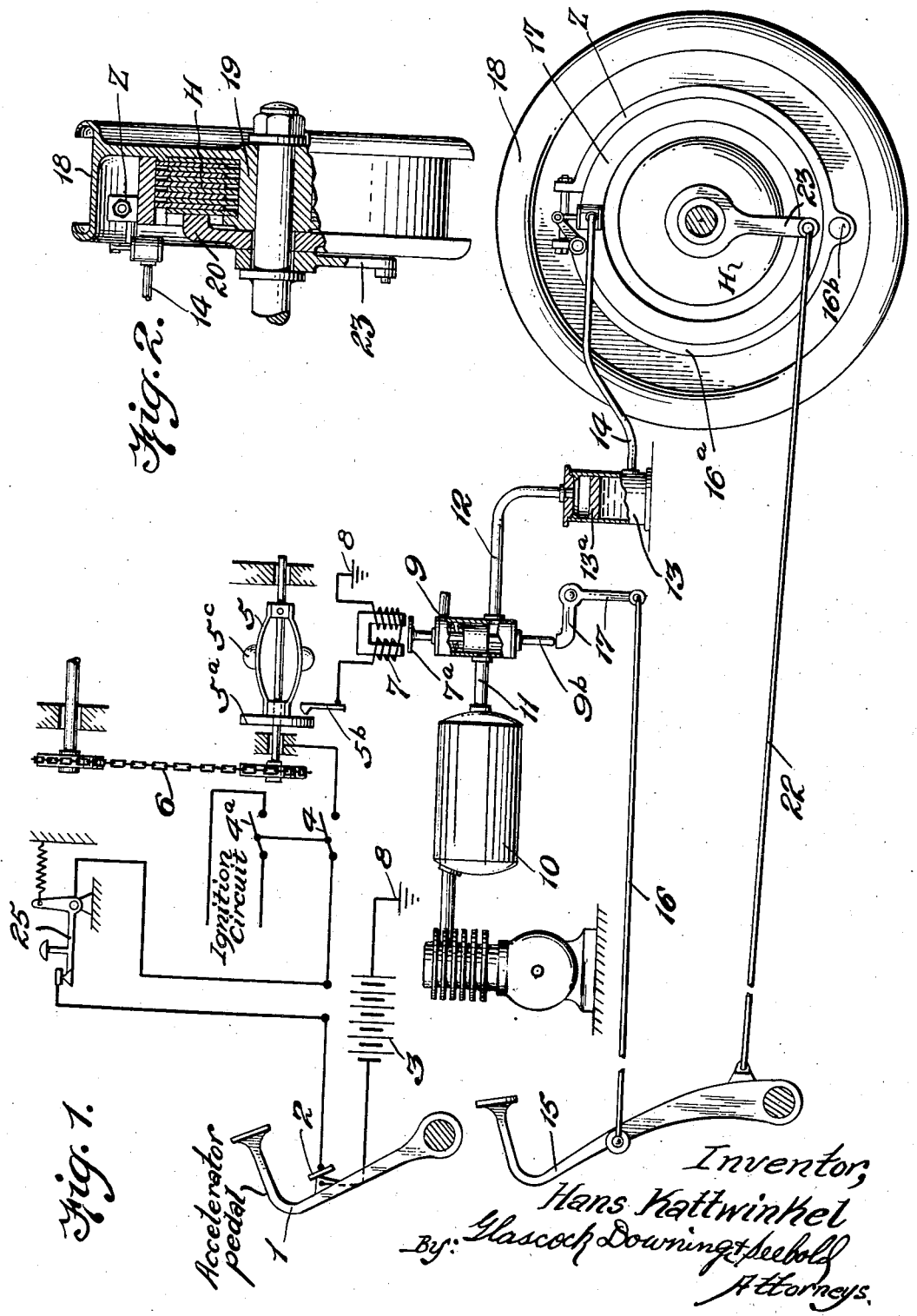
Inventor,
Hans Kattwinkel
By: Glascock Downing Seebold
Attorneys.

Patented Dec. 16, 1941

2,266,213

UNITED STATES PATENT OFFICE 2,266,213

BRAKE DEVICE, PARTICULARLY FOR AUTOMOBILE VEHICLES

Hans Kattwinkel, Radebeul, Germany

Application August 10, 1938, Serial No. 224,154
In Germany August 16, 1937

9 Claims. (Cl. 192—3)

My invention relates to a brake device particularly intended to automobile vehicles, which comprises a multiple disc brake (main brake), one of the two friction disc carriers of which (hereinafter named the fast disc carrier) is permanently connected with the associated vehicle part (underframe or road wheel), while the other disc carrier (hereinafter named the loose disc carrier) is rotatably supported in relation to both these vehicle parts (road wheel and underframe), and only when the braking is initiated is it clamped by a supplementary brake to the associated vehicle part (road wheel or underframe). Such a brake device is described for instance in my application Ser. No. 72,809 filed April 4, 1936 now Patent No. 2,148,818 issued Feb. 28, 1939.

When employing such brake devices on automobile vehicles, where the brake travel and the braking time are in general a great deal shorter than on rail vehicles, it is particularly important to reduce to a minimum the interval of time between the coming into operation of the brake (supplementary brake) that clamps the loose disc carrier and the actuation of the main brake, which become operative by the compression of the packet of friction discs, and to provide that the main brake nevertheless does not come into operation until after the revolving mass of the packet of discs has been brought to a standstill by the supplementary brake.

This problem is solved by the present invention without burdening the driver with additional operations to be carried out by him, by providing a device which brings the supplementary brake into operation automatically when the driver releases the accelerator pedal for the purpose of actuating the brake pedal. This result may advantageously be obtained, when the actuation of the supplementary brake is electromagnetically initiated, by automatically closing a switch in the circuit of the actuating magnet by means of the accelerator pedal after its release by the driver. The circuit in question preferably includes a further switch, which automatically interrupts the circuit when the vehicle is stationary, whereas the switch is automatically closed when driving, this being effected for example by means of a centrifugal governor driven from the driving wheels of the vehicle.

A preferred form of construction of my invention, employing an electro-magnetically controlled actuating member for the supplementary brake, is illustrated by way of example in the accompanying drawing.

In the drawing:

Fig. 1 is a general organization view of the brake control arrangement.

Fig. 2 is an axial sectional view of the brake mechanism.

In this drawing H is the main brake, Z the supplementary brake, I the accelerator pedal, and 15 the brake pedal of the vehicle. The supplementary brake Z includes a resilient member 16a which is secured at 16b to the chassis of the vehicle. When the supplementary brake is actuated the ends of the resilient member 16a are drawn together and retain an annular member 17 which carries the outer group of disks of the main brake H. The annular member 17 is rotatably mounted relative to the wheel 18. A sleeve 19 forms or constitutes the carrier for the inner group of disks of the main brake H.

When applying the main brake the faces of the disks are moved into engagement with each other by means of a member 20 which is moved axially by a lever 23 connected to the brake pedal 15 by a pull rod 22. The lever 23 is provided with a ring-shaped portion having means thereon for moving the member 20 in an axial direction upon rotation of the lever 23.

The accelerator I is so related to an electric switch 2 that the switch is opened when the pedal is depressed, whereas it closes automatically when the latter is released. The switch 2 is included in the circuit of a battery or other source of current 3, the other terminal of which is grounded at 8. In the circuit of the switch 2 there is a further switch 4, which is so related to the switch 4a of the ignition circuit of the vehicle motor that it is opened and closed simultaneously with the latter. A third switch, included in the same circuit, is controlled by a centrifugal governor 5, which is operatively connected by a chain drive 6 with the driving wheels of the car in such a way that the centrifugal governor is set in rotation when the car is running, whereas it comes to a standstill when the car is stationary. The sleeve 5a of the governor 5 forms one contact of the related switch, the stationary contact 5b thereof being connected to a conductor which leads to an electro-magnet 7 and which is then connected to ground at 8. The armature 7a of the magnet 7 is connected with a control valve 9 for the compressed air stored in an air vessel 10, in such a way that when the armature 7a is attracted a connection is established between a compressed air pipe 11 coming from the vessel 10 and a pipe 12 leading to a reservoir 13 containing oil. A pressure is thereby exerted upon the piston 13a of the reservoir 13, and this pressure is communicated through a pipe 14 to the pressure members of the supplementary brake Z, whereby the latter is put into operation. This occurs, provided the switch 4 is closed and the contacts 5a and 5b are closed, as soon as the driver releases the accelerator 1, that is, whenever he wishes to actuate the brake pedal 15. The transmission of the movement of the latter to the brake lever 23 that effects the compression of the packet of friction discs of the main brake H is effected through the medium of the pull rod 22.

In order not to depend solely upon the electrical system described another device is provided, which mechanically actuates the compressed air control valve 9 simultaneously with the depression of the brake pedal 15, this being effected through the medium of a pull rod 16, which is attached to a bell-crank lever 17, which acts upon a control rod 9b co-operating with the valve 9. The result is thereby obtained that in the event of any failure of the electrical device for actuating the supplementary brake, the latter is in all cases actuated upon depression of the pedal for the main brake. Provision might be made in this case also, for instance by interposing a lost motion in the rod-and-lever mechanism in question, for effecting the actuation of the supplementary brake before the main brake becomes operative.

Upon starting the engine, or shortly after starting it, the driver's foot is usually not on the accelerator. The switch 2 is therefore closed until the driver starts the car. During this time, therefore, the supplementary brake would be applied. This however is prevented by the centrifugal governor 5. The springs of this governor are kept so soft that even at the lowest speed of rotation the weights 5c move outwardly and a contact occurs between the contact members 5a and 5b, and when the vehicle is stationary the contacts are under all circumstances opened, and therefore the circuit of the actuating magnet 7 is interrupted.

In descending long hills where the slope is slight, so that braking is not required, it may happen that the driver removes his foot from the accelerator in order to rest it. In this case the switch 2 would close, and the supplementary brake Z would be applied. In order to obviate this there may be mounted on the steering wheel for example a push button switch 25, which the driver depresses instinctively, after a little experience with the new brake system, as soon as he releases the accelerator, as a result of which the circuit closed by the switch 2 is interrupted. The actuating of the switch 25 may also be necessary if the driver, on long distances, for the purpose of resting his foot, desires to control the vehicle by means of the hand operated throttle.

I claim:

1. A brake system for a motor vehicle having an accelerator pedal comprising, a disk carrier connected to a wheel of the vehicle, a free disk carrier mounted rotatably with respect to the wheel, a group of friction disks mounted on each carrier, means for moving the disks of one group into engagement with the disks of the other group, means for connecting said free disk carrier to a part of the vehicle, and means for automatically actuating said connecting means when said accelerator pedal returns to a rest position.

2. A brake system for a motor vehicle having an accelerator pedal comprising, a disk carrier connected to a wheel of the vehicle, a free disk carrier mounted rotatably with respect to the wheel, a group of friction disks mounted on each carrier, means for moving the disks of one group into engagement with the disks of the other group, means for connecting said free disk carrier to a part of the vehicle, means for actuating said connecting means when the accelerator pedal is in a position of rest, and means for preventing operation of the actuating means when the vehicle is stationary.

3. A brake arrangement as claimed in claim 2 wherein the actuating means includes an electric circuit adapted to be closed when the accelerator pedal is in a position of rest, and magnetic means for controlling said actuating means.

4. A brake system for a motor vehicle having an accelerator pedal comprising, a disk carrier connected to a wheel of the vehicle, a free disk carrier mounted rotatably with respect to the wheel, a group of friction disks mounted on each carrier, means for moving the disks of one group into engagement with the disks of the other group, means for connecting said free disk carrier to a part of the vehicle, means for automatically actuating said connecting means when the accelerator pedal is in a rest position, and means responsive to the movement of the vehicle for rendering said actuating means operable.

5. A brake system for a motor vehicle having an accelerator pedal comprising, a disk carrier connected to a wheel of the vehicle, a free disk carrier mounted rotatably with respect to the wheel, a group of friction disks mounted on each carrier, means for moving the disks of one group into engagement with the disks of the other group, means for connecting said free disk carrier to a part of the vehicle, a source of current, a source of fluid pressure, a valve associated with said fluid pressure source for controlling said connecting means, an electromagnet associated with said valve and said source of current operably responsive to the rest position of said accelerator pedal for actuating said valve to operate said connecting means.

6. A brake system for a motor vehicle having an accelerator pedal comprising, a disk carrier connected to a wheel of the vehicle, a free disk carrier mounted rotatably with respect to the wheel, a group of friction disks mounted on each carrier, means for moving the disks of one group into engagement with the disks of the other group, means for connecting said free disk carrier to a part of the vehicle, a source of current, a source of fluid pressure, a valve associated with said fluid pressure source for controlling said connecting means, an electromagnet associated with said valve and said source of current operably responsive to the rest position of said accelerator pedal for actuating said valve to operate said connecting means, and means preventing current from said source from flowing through said electromagnet when the vehicle is stationary.

7. A brake system for a motor vehicle having an accelerator pedal comprising, a disk carrier connected to a wheel of the vehicle, a free disk carrier mounted rotatably with respect to the wheel, a group of friction disks mounted on each carrier, means for moving the disks of one group into engagement with the disks of the other group, means for connecting said free disk carrier to a part of the vehicle, a source of fluid pressure, a valve associated with the source of fluid pressure for controlling the actuation of said connecting means, a source of current, an electromagnet associated with said valve, a circuit extending from said source of current to said electromagnet, a switch adapted to be closed when the accelerator pedal is in a position of rest, and a switch in said circuit adapted to be closed when the ignition circuit of the vehicle is closed.

8. A brake arrangement as claimed in claim 7 including an additional manually operable switch in said circuit.

9. A brake arrangement as claimed in claim 1 characterized by the provision of supplementary means responsive to the actuation of the means for moving the disks into engagement with each other for actuating said connecting means.

HANS KATTWINKEL.